(12) United States Patent
Robertson et al.

(10) Patent No.: US 6,764,016 B2
(45) Date of Patent: Jul. 20, 2004

(54) IDENTIFICATION METHOD FOR DIP GALVANIZING

(75) Inventors: John A. Robertson, Chillicothe, OH (US); Christopher D. Speakman, Greenfield, OH (US); Edward S. O'Neal, Rockbridge, OH (US); G. David Hudelson, Pickerington, OH (US)

(73) Assignee: Infosight Corporation, Chillicothe, OH (US)

( * ) Notice: Subject to any disclaimer, the term of this patent is extended or adjusted under 35 U.S.C. 154(b) by 3 days.

(21) Appl. No.: 10/272,718

(22) Filed: Oct. 17, 2002

(65) Prior Publication Data

US 2004/0074972 A1 Apr. 22, 2004

(51) Int. Cl.[7] .............................................. G06K 19/00
(52) U.S. Cl. .................. 235/487; 235/455; 235/462.01; 427/555; 427/556
(58) Field of Search .................................. 235/487, 455, 235/462.01; 427/555, 556, 387, 554

(56) References Cited

U.S. PATENT DOCUMENTS

| | | | | |
|---|---|---|---|---|
| 4,791,267 A | * | 12/1988 | Yokoyama et al. | .... 219/121.69 |
| 5,340,628 A | * | 8/1994 | McKillip | .................... 428/41.3 |
| 5,422,167 A | * | 6/1995 | Robertson et al. | ........ 428/195.1 |
| 5,484,099 A | * | 1/1996 | Robertson et al. | .......... 228/176 |
| 5,714,234 A | * | 2/1998 | Robertson | ................ 428/195.1 |
| 5,855,969 A | * | 1/1999 | Robertson | ................... 427/555 |
| 6,063,458 A | * | 5/2000 | Robertson et al. | ............ 428/13 |
| 6,451,421 B1 | * | 9/2002 | Robertson et al. | ....... 428/315.5 |

* cited by examiner

Primary Examiner—Michael G. Lee
Assistant Examiner—Steven S. Paik
(74) Attorney, Agent, or Firm—Mueller and Smith, LPA

(57) ABSTRACT

A method for identifying dip-galvanized parts commences with marking a tag (e.g., metal) with identification indicia for a galvanizable part. The markings and the tag are resistant to molten zinc. A temporary film is applied over the identification indicia. The temporary film is resistant to pre-galvanizing treatment, but is removed (burned away) during dip galvanizing without obscuring the readability of the identification indicia. Finally, the metal tag is associated with the galvanizable part and the part galvanized in a molten zinc bath.

30 Claims, 1 Drawing Sheet

US 6,764,016 B2

IDENTIFICATION METHOD FOR DIP GALVANIZING

CROSS-REFERENCE TO RELATED APPLICATIONS

None.

STATEMENT REGARDING FEDERALLY SPONSORED RESEARCH

Not applicable.

BACKGROUND OF THE INVENTION

The present invention relates generally to the need to identify (track) individual pieces (e.g., ferrous metals such as steel) during dip galvanizing and more particularly to a method therefor.

In the manufacture of a stadium steel beam (by way of illustration and not limitation), the beam is fabricated according to a mechanical drawing having a drawing number and then shipped to a galvanizer. Often, the steel beam is devoid of any identification marks, other than possibly a dot peen marking or coded "punch" marks. The relatively thick galvanizing coating that the galvanizer is going to apply easily later obscures such physical marks.

Traditional adhesive backed paper or polyester labels cannot be used for identification, because they would prevent a portion of the beam from being properly cleaned and the subsequent protective galvanizing would not be tight on those areas. Likely, the paper or polyester label would be destroyed by the dip galvanizing process too.

Wired on polyester or paper labels will be lost in the galvanizing dip (~850° F.). Wired on metal tags could be used if they are deeply embossed, but such embossing does not provide for automatic identification, such as, for example, standard (black/white) bar codes. The galvanizing cleaning processes (e.g., alkali dip followed by acid dip, and flux dip, and molten zinc) will destroy a high percentage of traditional prior art painted tags.

It is the ability to provide product identification (tracking) for dip-galvanized parts to which the present invention is addressed.

BRIEF SUMMARY OF THE INVENTION

A method for identifying dip-galvanized parts commences with marking a tag (e.g., metal) with identification indicia for a galvanizable part. The indicia tag coating and the tag material are resistant to molten zinc. A temporary film is applied over the identification indicia. The temporary film (coating) is resistant to pre-galvanizing treatment, but is disintegrated or burned off during dipping in molten zinc (galvanizing) without obscuring the readability of the identification indicia. Finally, the metal tag is associated with the galvanizable part.

Advantages of the present invention include the ability to mark galvanized parts with readable identification indicia before and after galvanizing operations. Another advantage is that readable indicia can be computer read. A further advantage is that the galvanizing operations do not need to be altered to accommodate the invention. These and other advantages will be readily apparent to those skilled in the art based on the disclosure set forth herein.

BRIEF DESCRIPTION OF THE DRAWINGS

For a fuller understanding of the nature and advantages of the present invention, reference should be had to the following detailed description taken in connection with the accompanying drawings, in which.

Figure 1:
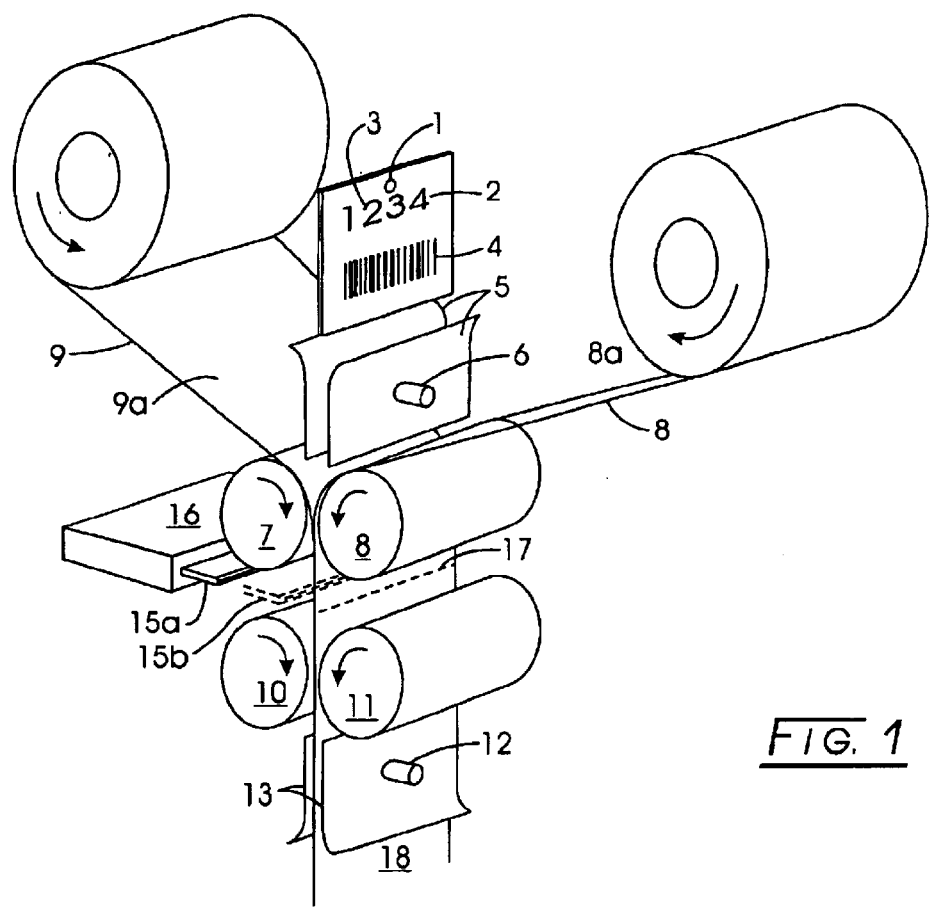
FIG. 1 is a perspective view of an illustrative adhesive backed film applicator.

The drawings will be described in detail below.

DETAILED DESCRIPTION OF THE INVENTION

Several definitions are appropriate for the present invention:

By "readable" is meant that the identification indicia can be read by the intended method, i.e., human readable or machine-readable.

By "identification indicia" is meant information about the part including, for example, manufacturing date, drawing number, part number, manufacturing location, manufacturer, site assembly location, etc.

By "resistant to dip galvanizing" is meant that the tag stays attached to the part and survives all of the galvanizing steps and is intact to an extent that the identification indicia can be read.

By "dip galvanizing" is meant the application of a molten zinc-based coating to a part to cover designated surfaces of the part.

By "pre-galvanizing treatment' is meant alkali dipping, acid dipping, flux dipping, and/or any other treatment of part to make is suitable and ready for dip galvanizing.

By "resistant to pre-galvanizing treatment" is meant that the temporary coating stays Intact during the pre-galvanizing treatment to such an extent that the underlying identification Indicia remain readable.

By "without obscuring readability" is meant that the identification indicia remain readable.

A tag bearing readable identification indicia is disclosed in U.S. Pat. No. 5,855,969. The tag preferably is metal, although ceramic and other exotic materials are possible. Cost considerations, however, currently make metal (e.g., a ferrous metal such as steel) the material of choice for the tag. Such a tag can withstand molten zinc, because molten zinc does not "wet" the tag's siloxone coated surface.

The '969 patent employs a layer of coating containing silicone resin having pendant groups selected from one or more of methyl groups and phenyl groups, and a white (e.g., opacifying) pigment (e,g., $TiO_2$ and/or $TiO_2$ coated mica) The layer has been cured to a degree effective for marking by blackening of the layer by a laser beam. Other tag coatings resistant to pre-galvanizing treatment can be used as is necessary, desirable, or convenient.

The coatings of choice, then, are silicone or siloxone resin coatings, such as described in "Silicone Resin Emulsions for High-Temperature Coatings", *Modem Paint and Coatings,* September 1993, Argus, Inc., Atlanta, Ga. (1993). Silicone resin binders typically are heat-cured in the presence of catalysts with typical catalysts being selected from acids, bases, and the salts of metals, for example, zinc, tin, lead, or chromium octoates. Silicone resins can be blended or chemically combined with other film-forming polymers provided that the ultimate cured phenyl-substituted silicone binder is stable at the hot metal temperatures of use of the inventive labels. Phenyl-substituted resins are well known in the art, such as represented by D. H. Solomon, *The Chemistry of*

*Organic Film Formers,* Second Edition, Robert E. Krieger Publishing, Inc., pp 334 et seq. (1977). The disclosures of the cited references are expressly Incorporated herein by reference.

The inventive marking scheme desirably employs a composition, which is darkenable (e.g., blackened) by the focused $CO_2$ or other laser energy. Because many of the applications of this technology may involve the imaging of bar codes (red light absorptive or "black" bars on a white background), the composition should be highly reflective to the red light commonly used to scan such bar codes. White or red coatings, then, are preferred. For human readable characters (e.g., one or more of alphanumeric characters or graphics), white backgrounds are preferred.

After coating, the tag now is ready to be marked by the energy of a focused laser beam emitted from a laser. A $CO_2$ laser is preferred for its cost effectiveness and ruggedness in industrial environments. Other lasers, however, can be used at the expense of cost and risk of eye damage in industrial environments. Marking of the tag preferably is accomplished in accordance with the raster-scanning technique disclosed in U.S. Pat. No. 5,855,969. In accordance with this technique, the tags move in the x-axis direction past a raster-scanning infrared laser beam emitting $CO_2$ laser that raster-scans in the Y-axis for forming the indicia on the tags. Scanning the laser beam through the use of two galvanometers (so-called X/Y scanning) and a flat field focusing lens also is a preferred marking method.

A temporary film then is applied over the marked (imaged) tag surface after marking. This assures that the film is void free (not affected by the laser marking process). The temporary film is resistant to pre-galvanizing treatment. Such film can be applied wet and dried (cured) or can be applied as a free-standing film optionally with an adhesive. Acrylic, vinyl, and synthetic rubber adhesives are common. Any technique whereby the film can be applied and remain in place during the pre-galvanizing treatment is acceptable for purposes of the present invention. Suitable materials include, for example, acetate films, acrylic films, vinyl films, polyethylene films, polypropylene films, and the like. Testing has revealed that polypropylene films with synthetic rubber adhesives provide good chemical resistance through the pre-galvanizing treatments and burn away cleanly during the molten metal dip.

An instructive adhesive backed film applicator is shown in FIG. 1. The metal tag, 1, has been coated at least on one side, 2, with a cured siloxone coating and has been previously laser marked with man readable characters, 3, and bar code indicia, 4. A finger guard guide, 5, guides the entry of tag 1 and contains a sensor, 6, which detects the insertion of a new tag, such as tag 1. Upon such detection, powered laminating rollers, 7 and 8, are rotated In the direction shown by the arrows to draw in and laminate tag 1 with an adhesive film, 8, and optional adhesive backed film, 9. The adhesives film sides 8*a* and optionally 9*a* are bonded to the tag surfaces, e.g., side or surface 2. Film 8 protects surface 2, characters 3, and indicia 4 from the galvanizing caustic, acidic, and flux pre-treatments, and optional film 9 similarly protects the tag's unmarked surface.

Another pair of rollers, 10 and 11, are rotated in the direction shown by the arrows with a limited torque drive (details not shown). Once the leading edge of tag 1 is sensed by a second sensor, 12, in a lower guide, 13, and the top edge of tag 1 is located at position 17, a heated wire, 15, is extended by an actuator, 16, from a first position, 15*a,* to a second position, 15*b,* whereby film 8 and option film 9 is cut and tension rolls, 10 and 11, proceed to draw tag 1 toward an exit, 18.

Figure 2:
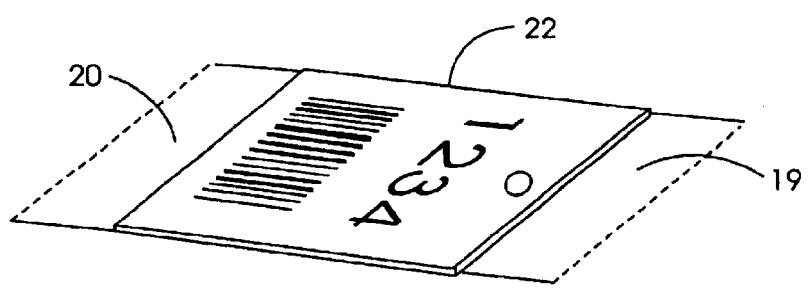
FIG. 2 is a perspective view of the completed inventive tag which is preferably tape protected on both sides and made by the applicator of FIG. 1.

FIG. 2 depicts a completed inventive tag, 22, which is preferably tape protected on both sides so that the areas shown as 19 and 20 are excess tape bonded together so as to prevent exposure of any bare adhesive, thereby making the inventive tag easy to handle. An optional hole, 21, is used to facilitate wire attachment of tag 1 to a part for its identification, which is to be pretreated and galvanized. The attaching wire is simply pushed through hole 21 and the protective film(s).

The tag can be affixed to the part to be dip galvanized by a variety of techniques either before or after being coated and/or laser marked. In this regard, the tag can be welded (e.g., spot welded) onto the part, attached with a wire (as facilitated by hole 21 in FIG. 2), or by any other technique at hand.

Pre-galvanizing treatment of the part typically involves an alkali dip (e.g., 180° F. with 10% NaOH for 45 minutes), followed by an acid dip (e.g., 155° F. with 14% $H_2SO_4$ for 30 minutes), followed by flux dipping (e.g., zinc chloride/ ammonium chloride solution for 30 seconds). It will be appreciated that a variety of additional alkali's can be used, such as, for example, alkali metal hydroxides, oxides, and the like. Strong bases (e.g., oxides, alkoxides, and the like) based on other than alkali metals also can be used at the risk of increasing costs. The same is true for the acid dip as other mineral and organic acids can be used. The flux dipping also can employ additional fluxes, as those skilled in the art will appreciate.

Galvanizing operations as commercially practiced employ a molten zinc or zinc-based bath held at elevated temperature (e.g., ~850° F.). The part with attached tag is immersed or dipped into the molten zinc bath for a time sufficient for the exterior or exposed surfaces of the part to be coated with zinc (say, around 12 minutes). Thereafter, the part is removed from the bath and the zinc coating permitted to cool. The pre-treatment protective film will be burned and/or melted in the zinc bath to expose the imaged identification indicia, which are resistant to the zinc bath in terms of the readability of the identification indicia, i.e., without obscuring readability of the identification indicia.

While the invention has been described with reference to a preferred embodiment, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, i is intended that the invention not be limited to the particular embodiment disclosed as the best mode contemplated for carrying out this invention, but that the invention will include all embodiments falling within the scope of the appended claims. In this application all units are in the metric system and all amounts and percentages are by weight, unless otherwise expressly Indicated. Also, all citations referred herein are expressly incorporated herein by reference.

We claim:

1. A method for identifying dip galvanized parts, which comprises the steps of:
   (a) marking a tag, having a front surface and a back surface, on said front surface with readable identification indicia for a galvanizable part, said markings and tag front surface being resistant to dip galvanizing;
   (b) applying a temporary film over said identification indicia, said temporary film being resistant to pre-galvanizing treatment, but being burned off during dip galvanizing without obscuring readability of said identification indicia; and (c) affixing said tag to said part; and (d) dip galvanizing said part, said temporary film being burned off during said dip galvanizing to reveal said identification indicia.

2. The method of claim 1, wherein said galvanizable part is a ferrous part.

3. The method of claim 1, wherein said tag is made from a metal.

4. The method of claim 1, wherein said tag is a steel tag.

5. The method of claim 1, wherein said readable identification indicia is one or more of human readable or machine-readable.

6. The method of claim 1, wherein said temporary film is one or more of an acetate film, an acrylic film, a vinyl film, a polyethylene film, or a polypropylene film.

7. The method of claim 6, wherein said temporary film is adhered to said tag with an adhesive.

8. The method of claim 1, wherein said marking is formed by laser blackening a coating formed from a silicone resin having pendant groups selected from one or more of methyl groups and phenyl groups and which contains a white pigment.

9. The method of claim 8, wherein said laser blackening is made with a $CO_2$ laser beam.

10. The method of claim 1, wherein said readable identification indica is one or more of alphanumeric symbols or graphics.

11. The method of claim 1, wherein a second temporary film is applied over said rear surface of said tag.

12. The method of claim 1, wherein said temporary film is applied over said front surface of said tag.

13. A tag with readable identification indicia comprising:

(a) a tag having a front surface and a back surface with said front surface marked with readable identification indicia for a galvanizable part, said markings and tag front surface being resistant to dip galvanizing; and (b) a temporary film applied over said identification indicia, said temporary film being resistant to pre-galvanizing treatment, but being burned off during dip galvanizing without obscuring readability of said identification indicia.

14. The tag of claim 13, wherein said tag is affixed to a galvanizable part.

15. The tag of claim 14, wherein said galvanizable part is a ferrous part.

16. The tag of claim 13, wherein said tag is made from a metal.

17. The tag of claim 15, wherein said tag is a steel tag.

18. The tag of claim 13, wherein said readable identification indicia is one or more of human readable or machine-readable.

19. The tag of claim 13, wherein said temporary film is one or more of an acetate film, an acrylic film, a vinyl film, a polyethylene film, or a polypropylene film.

20. The tag of claim 19, wherein said temporary film adhered to said tag with an adhesive.

21. The tag of claim 13, wherein said marking is formed by laser blackening a coating formed from a silicone resin having pendant groups selected from one or more of methyl groups and phenyl groups and which contains a white pigment.

22. The tag of claim 13, wherein the temporary film is a polypropylene film affixed with a synthetic rubber adhesive.

23. The tag of claim 20, wherein the temporary film is a polypropylene film affixed with a synthetic rubber adhesive.

24. The tag of claim 20, wherein said laser blackening is made with a $CO_2$ laser beam.

25. The tag of claim 23, wherein said laser blackening is made with a $CO_2$ laser beam.

26. The tag of claim 13, wherein a second temporary film is applied over said back surface of said tag.

27. The tag of claim 26, wherein said tag has a pair of oppositely-disposed edges and wherein said temporary and second temporary films extend over said edges and are adhered together by an adhesive.

28. The tag of claim 13, wherein said tag has a hole penetrating therethrough for attachment to a galvanizable part.

29. The tag of claim 25, wherein a second temporary film is applied over said back surface of said tag.

30. The tag claim 29, wherein said tag has a pair of oppositely-disposed edges and wherein said temporary and second temporary films extend over said edges and are adhered together by an adhesive.

* * * * *